United States Patent Office 3,444,121
Patented May 13, 1969

3,444,121
AQUEOUS RUBBERY TERPOLYMER LATEX
CONTAINING AN EPOXY RESIN
Vincent A. Altier, Akron, and Edward T. Wells, Barberton, Ohio, assignors to The Firestone Tire & Rubber Company, Akron, Ohio, a corporation of Ohio
No Drawing. Filed Dec. 23, 1965, Ser. No. 516,146
Int. Cl. C08d 1/09, 9/10
U.S. Cl. 260—29.7    12 Claims

ABSTRACT OF THE DISCLOSURE

There is provided a latex of improved wash resistance, the latex being formed from a conjugated diolefin such as butadiene, a vinyl aromatic hydrocarbon such as styrene, and an aliphatic unsaturated dicarboxylic acid such as fumaric acid. Such latices are improved in the foregoing respect by including a small amount of epoxy compound.

---

This invention relates to a composition of matter and more particularly to synthetic rubber compositions which are characterized in that the washability of relatively thin sections is improved. The invention is embodied in a synthetic rubbery terpolymer having improved wash resistance and formed from a conjugated diolefin such as butadiene; a vinyl substituted aromatic hydrocarbon, such as styrene; and an aliphatic unsaturated dicarboxylic acid, such as fumaric acid. These latices are improved in respect of wash resistance by the inclusion of a minor amount of an epoxy compound, and particularly so when the pH of the latex of which has been adjusted wtih a basic nitrogen compound, e.g. ammonia, hydrazine, low molecular weight amines or hydroxylamine, preferably a nitrogen containing base material, volatile at ordinary temperatures in addition to the inclusion of the epoxy compound.

In recent years the floor covering and upholstery industries have utilized various synthetic rubber coating compositions on the reverse sides of floor covers, for example carpeting and the reverse sides of upholstery fabrics to prevent slippage between the covering or fabric and the supporting substrate. These materials also have the effect of acting as adhesives not only as between the covering material and the substrate, but also improving the bond between the tufting material, for example in carpeting, and its backing. A principal difficulty with prior compositions has been their resistance to wash solutions containing detergent materials. Commercial cleaning processes involve the use of modern detergent compositions which have resulted in loss of adhesive power and destruction of the non-slip characteristics of the coated material.

It has been found that when synthetic rubber terpolymerization products in the latex form and produced by an emulsion polymerization technique are rendered basic, that is the pH is adjusted to from 8 to 11, improved washability of coatings produced from such latices is obtained when a minor amount of an epoxy compound is included, and particularly so when the pH adjustment of the latex has been made with a nitrogen compound such as ammonia, hydrazine, an amine, or a low molecular weight hydroxylamine.

The synthetic rubbery terpolymerization products and their production in the latex form is described in detail in the co-pending application of Vincent A. Altier Ser. No. 505,015, filed Oct. 24, 1965, now abandoned, to which reference may be had.

Briefly stated, therefore, the present invention is in an adhesive composition including a synthetic rubber terpolymerization product of from 75 to 25 parts by weight of a conjugated diolefin containing 4 to 6 carbon atoms, from 25 to 75 parts by weight of a vinyl substituted aromatic hydrocarbon, and from 1 to 5 parts by weight of an aliphatic unsaturated dicarboxylic acid containing 4 to 5 carbon atoms or anhydride, or a mono- or di- $C_1$ to $C_4$ alkyl ester thereof, and from 0.25 to 1.0 part per 100 parts of synthetic rubber solids of an epoxy compound. These compositions in which the pH of the latex has been adjusted to be within the range of from 8 to 11 with ammonia, ammonium hydroxide, hydrazine, hydrazine hydrate a $C_1$ to $C_3$ mono- or di- amine, or an aliphatic hydroxylamine containing 2 to 6 carbon atoms as well as including the epoxy compound show still more improved adhesive and wash resistant characteristics.

The terpolymerization product is produced by an emulsion polymerization procedure which, but for the inclusion of the termonomer aliphatic unsaturated dicarboxylic acid and the treatment with the nitrogen containing basic material, is in all other respects identical with current practices for the production of synthetic rubber latices from a conjugated diolefin and a vinyl substituted aromatic hydrocarbon. The resultant product is a synthetic rubbery terpolymerization product in aqueous emulsion form, i.e. latex form which when applied to the back surface of a floor covering material or upholstery material and dried by exposure to heat at an elevated temperature for a predetermined period of time yields a product in which the material is substantailly undiscolored or clear, and in which undesirable stiffening is absent. It will be unnecessary to prolong this description by reproducing herein examples of conventional synthetic rubber recipes since these are well known to those skilled in the art. Such recipes are made in accordance with this invention by the inclusion therein prior to polymerization of from 1 to 5 parts by weight per 100 parts of combined conjugated unsaturated aliphatic material and vinyl substituted aromatic hydrocarbon, of an aliphatic unsaturated dicarboxylic acid, anhydride, or low molecular weight mono ester thereof.

At the conclusion of the emulsion polymerization technique, which is normally carried out on the acid side of a neutral pH, the pH is adjusted to the alkaline side between the value of about 8 to 11. In accordance with this invention, this adjustment is preferably made with a nitrogen containing compound such as ammonium, ammonuim hydroxide, etc. as indicated above, although any suitable base may be used such as sodium hydroxide or KOH.

Accordingly, as the conjugated unsaturated aliphatic material useful in accordance herewith there may be used butadiene-1,3 which is a preferred material, pentadiene-1,3; 2-methyl butadiene-1,3 (isoprene); 1,4-dimethyl butadiene-1,3; and 2-chlorobutadiene-1,3.

As the vinyl substituted aromatic hydrocarbon there may be used, vinyl benzene (styrene), vinyl toluene, alpha-methyl styrene, and mixtures of the foregoing with divinyl benzene.

As the unsaturated aliphatic dicarboxylic acids or anhydrides there may be used in accordance herewith maleic acid or its anhydride, fumaric acid, or itaconic acid, or itaconic anhydride, or a low molecular weight mono-ester thereof, i.e. mono-methyl, -ethyl, -propyl or -butyl ester.

As the preferred pH adjusting agents there may be used ammonia or aqueous solutions thereof, e.g. ammonium hydroxide, hydrazine, hydrazine hydrate, ethylamine, ethylene diamine, propylamine, iso-propylamine, di-iso-propylamine, butylamine, trimethylene diamine, tetramethylene diamine, monoethanolamine, diethanolamine, triethanolamine.

The epoxy compounds as a group are well known. They are used in the compositions of the present invention to improve adhesion and washability in a very low concentration generally in the range of from about .25 to 1.0 part by weight per 100 parts of dried elastomer solids. Those which are particularly useful herein have an epoxy equivalent of from 1 to 2.

Typical examples of epoxy compounds include those which result from the interaction of epichlorohydrin with a dihydric phenol, for example Bisphenol A (dimethyl, di-p-hydroxy phenyl methane). These materials are condensed to form linear polymers having molecular weights in the range of from about 500 to 1500. Other epoxy compounds include dicyclopentadiene dioxide, 1-epoxy-ethyl-3,4-epoxy-chlorohexane, the reaction products of epichlorohydrin with various polyamides etc. These are all well known to those skilled in the art. See for example United States Patent Nos. 2,558,949; 2,548,447 and 2,542,664 for examples of epoxy compounds useful herein.

These resins are emulsified in water utilizing a suitable compatible emulsion system, for example having the same emulsifiers and wetting agents as employed with elastomer solids to the extent of about 50% solids. The emulsion is added directly to the latex produced in accordance with the foregoing and preferably having the pH adjusted with a nitrogen containing material such as, ammonium hydroxide.

As indicated above, the terpolymer recipes in accordance herewith are substantially the same as conventional synthetic rubber recipes except for the inclusion of from 1 to 5 parts by weight per 100 parts of conjugated diolefin and vinyl substituted aromatic hydrocarbon, combined, of the aliphatic unsaturated dicarboxylic acid, anhydride or ester as above described.

The usual wetting agents, initiator catalysts and sequestering agents may be employed in the terpolymerization recipes hereof. Mono-carboxylic acids may also be included along with the unsaturated dicarboxylic acids for improved heat stability and flexibility properties. It becomes convenient at this point to illustrate the production of synthetic rubber terpolymers produced by an emulsion polymerization technique which is conventional except for the inclusion of the unsaturated dicarboxylic acid termonomer, it being understood that numerous additional specific examples will become readily apparent to those skilled in the art in the light of the following examples and this disclosure.

Example I

| | |
|---|---|
| Water | 89.0 |
| Dodecylbenzene (alkyl aryl) sodium sulfonate | 1.6 |
| Nonyl phenoxy poly(ethylene oxy) ethanol | 0.4 |
| Sodium salt of ethylene diamine tetra acetic acid (EDTA) | 0.03 |
| Potassium persulfate | 1.3 |
| Fumaric acid | 3.0 |
| Tert. dodecyl mercaptan | 0.55 |
| Styrene | 44.0 |
| Butadiene | 53.0 |

The numerical values in the foregoing recipe are parts by weight. The foregoing recipe is not restricted to the amounts or types of chemicals so long as the unsaturated dicarboxylic acid is present. Other examples of anionic surfactants include the dihexyl ester of sodium sulphosuccinic acid, sodium or potassium or lauryl sulphate salts, alkyl aryl sulphonic acids, and many other types of anionic and non-ionic surfactants may be used to support polymerization. Generally, the emulsifiers and the sodium EDTA are charged as a single aqueous solution. The dicarboxylic acid is slurried in water, the persulphate initiator, e.g. potassium persulphate is also slurried in water. The styrene, butadiene, and modifier are charged separately into emulsion polymerization vessels which is agitated and in which the temperature is maintained at from about 140° F. to 165° F. Conversion is about 95 to 100%, the unreacted components are stripped off and recycled for reuse in the process. The solids content of the reaction mass is approximately 53% and the time of reaction 20 hours. The pH is adjusted to 9 with ammonium hydroxide. Reaction masses in amounts ranging from 5 gallons to 3750 gallons have been made pursuant to the foregoing formulation. In the foregoing recipe, the amounts and types of surfactant may be varied. The styrene concentration has been varied between 25% and 75% and the butadiene concentration varied between 75% and 25%. The amount of fumaric acid has been as low as 1 and as high as 5 parts per 100 parts of butadiene-styrene monomers. Other dicarboxylic acids and derivatives which may be used in place of the fumaric acid in the above recipe include itaconic, maleic, maleic anhydride, n-butyl itaconate.

Example II

| | |
|---|---|
| Water | 95 |
| Decyl benzene sodium sulphonate | 4 |
| Nonyl phenoxy poly(ethylene oxy) ethanol | 1.0 |
| EDTA | 0.03 |
| Potassium persulphate | 0.3 |
| Potassium sulphate | 0.4 |
| Fumaric acid | 2.0 |
| Tert. dodecyl mercaptan | 0.75 |
| Styrene | 44.0 |
| Butadiene | 54.0 |

The foregoing recipe was emulsion polymerized at a temperature of 140° F.–165° F. for a period of 16 hours. The conversion was 95–100%, and the pH was adjusted from 2.5 at the conclusion of the polymerization reaction to a pH of 9 with ammonium hydroxide.

The emulsifiers, potassium sulphate, and EDTA (ethylene diamine tetraacetic acid) were charged as one solution to the reactor. The potassium persulphate and fumaric acid were slurried as separate solutions. The modifier, tertiary dodecyl mercaptan, the styrene and butadiene were charged to the reactor separately. Latices have been prepared in connection with the foregoing formulations in amounts ranging from 28 ozs. to 3750 gallons.

Other electrolytes which are equally effective include ammonium chloride, ammonium carbonate, sodium carbonate, borax and sodium sulphate.

Example III

| | Parts by weight |
|---|---|
| Latex in accordance with Example I 50% total solids | 200 |
| China clay | 73 |
| Dialkyl phenol sulphide | 1 |
| Sodium polyacrylate thickener | 2 |
| Bisphenol A—epichlorohydrin resin (M.W. 1000) | 0.5 |

This composition is thickened to 6000 to 8000 cps. with No. 4 spindle 30 r.m.p., LVF Brookfield viscometer. Although amounts as high as 1 part of epoxy compound per 100 parts of dried elastomer have been found to be effective, larger amounts are as effective, for example, up to 5 parts per 100 parts of resin.

The composition is coated upon an upholstery material by a spreader bar at the rate of 1–2 ozs. per square yard, and cured in a forced air oven for a period of 10 minutes at a temperature of 250° F. Samples were cooled to room temperature and then washed in a commercial agitator type washing machine using an 0.5 part Tide solution at 180° F. for 40 minutes.

The samples were rated by the degree of frayed edges which showed the amount of compound washed from the upholstery. Where little or no fraying was observed the rating was excellent. Slight fraying was given a rating of good, moderate fraying a rating of fair, heavy fraying a rating of poor, and extreme fraying a rating of failure. The composition of Example III had an excellent rating.

In other tests, it was observed that compound latex samples in which the pH was adjusted with sodium hydroxide but without the addition of epoxy resin failed during the washing test with nearly all the compound washed from the upholstery. Latices neutralized with ammonium hydroxide but in which no epoxy was utilized had a rating of poor to fair. Sodium hydroxide neutralized latex compositions with epoxy resin present obtained ratings of fair. Ammonium hydroxide neutralized latex compositions containing epoxy resin were rated good to excellent in the wash test depending upon the type and amount of epoxy resin used. The epoxy resin of Example III was particularly good. A polyamide epichlorohydrin resin was also excellent.

From the foregoing examples those skilled in the art will be able to formulate numerous additional examples within the scope and subject of the present invention. It has not been found that substitution of different unsaturated dicarboxylic acid causes any substantial difference in performance. Likewise, vinyl toluene may be substituted for part or all of the styrene in either of the foregoing recipes of Examples I and II.

Likewise, any of the aforementioned conjugated diolefins may be substituted for part or all of the butadiene in Examples I and II without noticeably affecting the nature of the results obtained. Also the other nitrogen-containing basic materials have shown similarly improved results in respect of washability.

There has thus been provided a useful synthetic rubber terpolymerization product formed from a conjugated diolefin, a vinyl aromatic compound and an unsaturated dicarboxylic acid or ester thereof.

What is claimed is:
1. A wash resistant synthetic rubbery latex emulsion terploymerization product of:
    (a) from 75 to 25 parts by weight of a conjugated diolefin containing from 4 to 6 carbon atoms;
    (b) from 25 to 75 parts by weight of a vinyl substituted aromatic hydrocarbon;
    (c) from 1 to 5 parts by weight of an unsaturated aliphatic dicarboxylic acid containing from 4 to 5 carbon atoms, or anhydride or a mono- $C_1$ to $C_3$ alkyl ester thereof, and including
    (d) from 0.25 to 1 part by weight per 100 parts of terpolymerization product of a bis-phenol-A-epichlorohydrin resin having an epoxy equivalent of from 1 to 2, and a molecular weight of from 500–1500.
2. A synthetic rubbery terpolymerization product in accordance with claim 1 in which the conjugated diolefin is butadiene.
3. A synthetic rubbery terpolymerization product in accordance with claim 1 in which the conjugated diolefin is isoprene.
4. A synthetic rubbery terpolymerization product in accordance with claim 1 in which the vinyl substituted aromatic hydrocarbon is styrene.
5. A synthetic rubbery terpolymerization product in accordance with claim 1 in which the vinyl substituted aromatic hydrocarbon is vinyl toluene.
6. A synthetic rubbery terpolymerization product in accordance with claim 1 in which the aliphatic dicarboxylic acid is maleic acid or maleic anhydride.
7. A synthetic rubbery terpolymerization product in accordance with claim 1 in which the aliphatic discarboxylic acid or anhydride is fumaric acid.
8. A synthetic rubbery terpolymerization product in accordance with claim 1 in which the aliphatic dicarboxylic acid is itaconic acid.
9. A synthetic rubbery terpolymerization product in accordance with claim 1 in which the conjugated diolefin is butadiene, the vinyl substituted aromatic hydrocarbon is styrene and the aliphatic dicarboxylic acid is fumaric acid.
10. A synthetic rubbery terpolymerization product in accordance with claim 1 in which the pH is adjusted with ammonium hydroxide.
11. A latex comprising an aqueous dispersion of a synthetic rubbery terpolymerization product of:
    (a) from 75 to 25 parts by weight of a conjugated diolefin containing from 4 to 6 carbon atoms;
    (b) from 25 to 75 parts by weight of a vinyl substituted aromatic hydrocarbon;
    (c) from 1 to 5 parts by weight of an unsaturated aliphatic dicarboxylic acid containing from 4 to 5 carbon atoms, or anhydride or a mono- $C_1$ to $C_3$ alkyl ester thereof, and including
    (d) from 0.25 to 1 part by weight per 100 parts of terpolymerization product of a bis-phenol-A-epichlorohydrin resin having an epoxy equivalent of from 1 to 2, and a molecular weight of from 500 to 1500.
12. A latex in accordance with claim 11 which is additionally characterized in that the pH of the latex has been adjusted to within the range of from 8 to 11 with ammonia, ammonium hydroxide, hydrazine, hydrazine hydrate, a $C_1$ to $C_3$ monoamine, a $C_1$ to $C_3$ diamine, or an aliphatic hydroxylamine containing from 2 to 6 carbon atoms.

References Cited

UNITED STATES PATENTS

| 3,207,718 | 9/1965 | Zimmerman et al. | 260—836 |
| 3,256,234 | 6/1966 | Miller | 260—29.7 |
| 3,311,584 | 3/1967 | Zimmerman et al. | 260—29.7 |

SAMUEL H. BLECH, *Primary Examiner.*

W. J. BRIGGS, Sr., *Assistant Examiner.*

U.S. Cl. X.R.

117—140, 161; 260—78.5, 836, 837

PO-1050
(5/69)

UNITED STATES PATENT OFFICE
CERTIFICATE OF CORRECTION

Patent No. 3,444,121              Dated  May 13, 1969

Inventor(s)    Vincent A. Altier and Edward T. Wells

It is certified that error appears in the above-identified patent and that said Letters Patent are hereby corrected as shown below:

Col. 1, line 19, "of epoxy com-" should read
  --of an epoxy com- --

Col. 2, line 7, "These" should read --Those--

Col. 6, line 5 should read:
  --ylic acid or anhydride is maleic acid or maleic anhydride--

Col. 6, line 8 should read:
  --ylic acid is fumaric acid.--

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents